BEN JAMES HOBSON.
Stove-Pipe Drum.
No. 4,918. Reissued May 28, 1872.
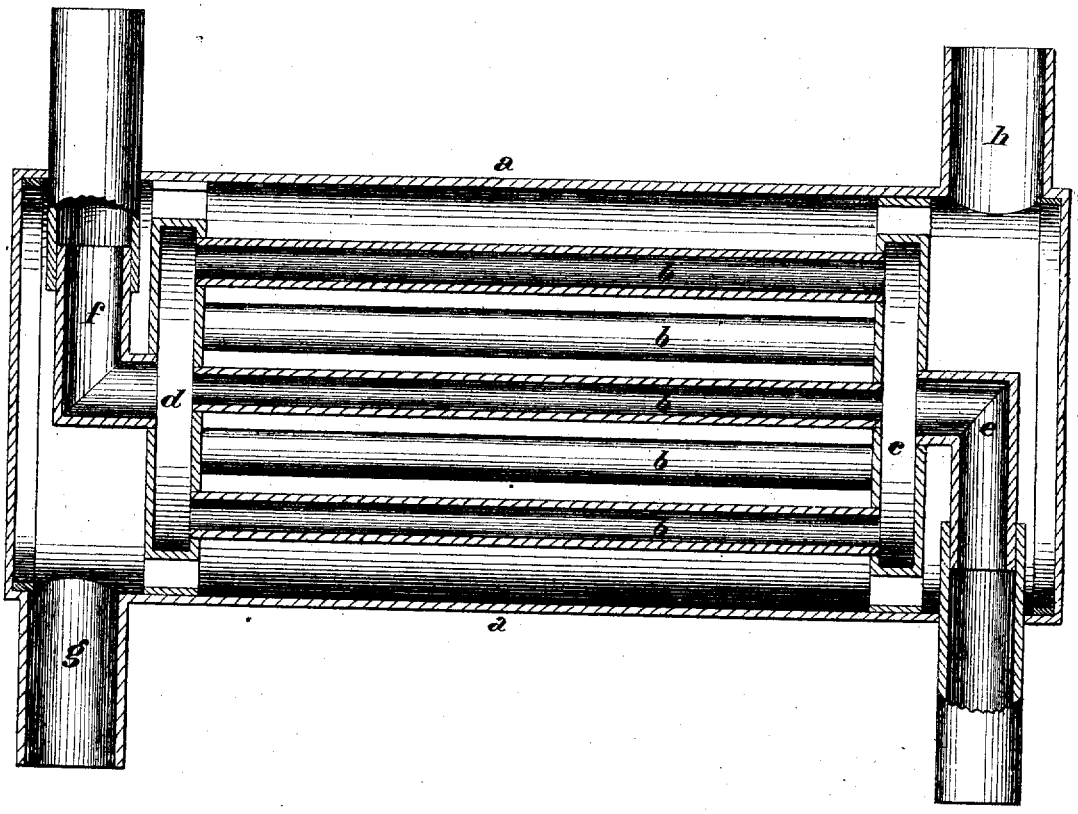
Attest
C. G. Hale,
M. Austin Goodman
Inventor
B J Hobson
AM. PHOTO-LITHOGRAPHIC CO. N.Y. (OSBORNE'S PROCESS.)

UNITED STATES PATENT OFFICE.

BEN JAMES HOBSON, OF COVINGTON, KENTUCKY, ASSIGNOR OF ONE-HALF INTEREST TO WILLIAM H. RICHARDSON, OF CINCINNATI, OHIO.

IMPROVEMENT IN STOVE-PIPE DRUMS.

Specification forming part of Letters Patent No. 119,609, dated October 3, 1871; reissue No. 4,918, dated May 28, 1872.

I, BEN JAMES HOBSON, of Covington, in the county of Kenton and State of Kentucky, have invented a certain new and useful Improvement in Apparatus for Utilizing Waste Heat, of which the following is a specification:

My invention is an improvement in the class of air-heating drums designed for connection with stoves, furnaces, &c., under any suitable or convenient local arrangement, for the purpose of utilizing the heat of the same by causing it to be imparted or radiated to the surrounding air. It is manifest that to attain this result in the best manner or by the best means the device or apparatus employed must be distinguished, viz., first, by simplicity of construction, and consequent cheapness in manufacture; second, by maximum amount or area of radiating surface, combined with minimum weight and utmost compactness in arrangement of parts; and third, by facility of admission and exit and uninterrupted passage of air and products of combustion.

It is in these respects that I claim my invention is pre-eminently an improvement over others, more especially that of W. Duryea and W. Ennis, patented April 30, 1867, No. 64,293. In that apparatus neither the air nor the products of combustion are enabled to pursue their natural upward course uninterruptedly, but are each deflected downward immediately on entering the drum—the one by vertical transverse partitions, the other by tubular supplementary receivers or drums arranged at the ends of the main drum or case, and connected at the bottom by a horizontal pipe. The said partitions subserve little or no useful purpose, since they serve to prolong the contact of the air with no heated portion of the drum and inevitably absorb caloric to a degree proportional to their thickness and superficial area. The external superficial area of the two inner drums is also wholly disproportionate to their length and width, so that they fail to utilize or radiate the heat contained in the products of combustion on their passage through them. Again, the alternately upward and downward course of the air and products of combustion retards their passage through the apparatus unnecessarily, thus entailing many disadvantages in its practical operation.

My invention remedies these and other defects of such construction by such arrangement of entrance and exit flues and radiating-tubes that the current of external air strikes first against that part of the apparatus which is least heated, and flows thence by its natural course in continuous contact with and toward the parts that are more highly heated.

The accompanying drawing illustrates an application of the principle of my invention.

In the apparatus there represented, *a* is a drum of any convenient size, having closed ends, within which is placed a longitudinal system of pipes, *b*, opening at their ends into short drums *c d*, standing crosswise within the larger drum. An elbow, *e*, opening into the outer end of the drum *c* extends downward through the drum *a*, and is intended to be connected with the escape-flue of a stove, furnace, or the like, through which elbow the products of combustion escape from the stove, passing into and through the drum *c*, pipes *b*, and drum *e*, from which latter the smoke and gases escape through an elbow, *f*, extending upward from the drum *d*, passing through the drum *a*, and opening into a chimney. A pipe, *g*, opens into the drum *a* under the elbow *f*, through which pipe cold air enters the drum. Coming in contact first with the drum *d*, whose temperature is necessarily the lowest of any part of the interior arrangements of the drum *a*, the current of cold air absorbs heat from said drum *d*. If the current striking the drum *d* were as hot as the latter, or hotter, it would not absorb heat from it; but by causing the external current to strike the drum *d* first, when said external current is colder than the drum *d*, I effect the absorption of the heat of the latter. As the external current circulates among the pipes *b* it becomes gradually hotter, but it is all the time coming in contact with surfaces hotter than itself, as the temperature of the pipes *b* increases directly as the distance from the drum *d*. Consequently the external current is constantly receptive of heat during its passage through the drum *a* in the opposite direction to that of the products of combustion. The external current escapes through the pipe *h*, and can be conducted thence to be utilized for any desired purpose. In this manner, by the time the products of combustion reach the elbow *f* they are supposed to have parted with the greater portion, if not all, of their heat.

What I claim as new, and desire to secure by Letters Patent, is—

An apparatus, substantially such as herein described, for utilizing heat by means of a current of external air striking first against that part of the apparatus which is least heated, and flowing thence in continuous contact with and toward the parts that are more highly heated.

B. J. HOBSON.

Witnesses:
W. AUSTIN GOODMAN,
C. G. HALE.